United States Patent [19]

Sarin et al.

[11] Patent Number: 4,701,384
[45] Date of Patent: Oct. 20, 1987

[54] COMPOSITE COATINGS ON CEMENTED CARBIDE SUBSTRATES

[75] Inventors: Vinod K. Sarin, Lexington, Mass.; Hans E. Hintermann, Ins, Switzerland

[73] Assignee: GTE Laboratories Incorporated, Waltham, Mass.

[21] Appl. No.: 4,999

[22] Filed: Jan. 20, 1987

[51] Int. Cl.⁴ .............................................. B32B 9/00
[52] U.S. Cl. .................................. 428/688; 428/689; 428/698; 428/701; 427/255.2; 427/255.3; 51/309
[58] Field of Search ............... 428/698, 688, 689, 701; 427/255.2, 255.3; 51/309

[56] References Cited

U.S. PATENT DOCUMENTS

Re. 32,111  4/1986  Lambert et al. .................. 428/698
4,441,894   4/1984  Sarin et al. ....................... 428/698
4,578,087   3/1986  Tanaka et al. .................... 428/698
4,598,053   7/1986  Yamakawa et al. ............... 51/309
4,619,866  10/1986  Smith et al. ...................... 428/698

Primary Examiner—John E. Kittle
Assistant Examiner—Beth A. Bozzelli
Attorney, Agent, or Firm—Frances P. Craig

[57] ABSTRACT

A wear resistant article, such as a cutting tool. A cemented carbide substrate is coated with a composite ceramic coating having at least two phases. The first phase is a continuous oxide matrix layer 0.1–20 microns thick of oxides of alumina, zirconia, or yttria. At least one discontinuous second or additional phase of oxides of aluminum, zirconium, or yttrium, or solid solutions thereof, is dispersed as discrete particles within the matrix layer. The additional phase material is different from the matrix material.

13 Claims, 3 Drawing Figures

COMPOSITE COATINGS ON CEMENTED CARBIDE SUBSTRATES

REFERENCE TO RELATED APPLICATIONS

This application is related to U.S. patent application Ser. No. (D-071,005,001), filed concurrently herewith, and incorporated herein by reference.

THE FIELD OF THE INVENTION

This invention relates to an article comprising a wear resistant coating deposited on a cemented carbide substrate, and more particularly to an article having a two or more phase composite oxide coating deposited on such a substrate.

BACKGROUND OF THE INVENTION

Cemented carbide materials are known and are used extensively in such applications as mining tool bits, metal cutting and boring tools, metal drawing dies, wear-resistant machine parts and the like. It is also known that the service properties such as wear, high temperature and chemical resistance of such materials may be enhanced by the application of one or more thin coatings of, for example, metal carbides, metal nitrides, or ceramics. Great strides have been made in improved performance of these coated substrates, for example in machining applications, by refinement of the substrate compositions and by applying various combinations of superimposed layers of coating materials. However, increasingly stringent use conditions, for example use at high cutting speeds or in extremely high temperatures and/or corrosive environments, are placing increasing demands upon the performance of such materials.

SUMMARY OF THE INVENTION

The invention described herein and recited in the appended claims provides an article in which a wear resistant composite coating of controlled composition and distribution is deposited on a cemented carbide substrate, the article showing improved abrasion resistance under extreme conditions of use.

A wear resistant article according to the invention comprises a cemented carbide substrate body having a fully dense, adherent, wear resistant, composite ceramic coating having at least two phases on the substrate. The coating comprises a continuous oxide layer about 0.1–20 microns thick of a material selected from the oxides of aluminum, zirconium, and yttrium. At least one discontinuous additional phase is dispersed as discrete particles within the oxide layer, the additional phase being of at least one material selected from the oxides of aluminum, zirconium, and yttrium, the material being different from that of the oxide layer.

In the preferred article according to the invention, at least one intermediate layer is deposited between the substrate body and the composite ceramic layer. The intermediate layer is about 0.5–10 microns thick and is of one or more materials selected from the carbides, nitrides, and carbonitrides of Ti, Zr, Hf, Va, Nb, Ta, Cr, Mo, W, Si, and B. The additional phase may be evenly dispersed within the continuous oxide layer, or the composite ceramic layer may be a stratified layer.

BRIEF DESCRIPTION OF THE DRAWINGS

For a better understanding of the present invention, together with the objects, advantages, and capabilities thereof, reference is made to the following disclosure and appended claims, taken together with the drawings, of which

DETAILED DESCRIPTION OF THE INVENTION

Figure 1:
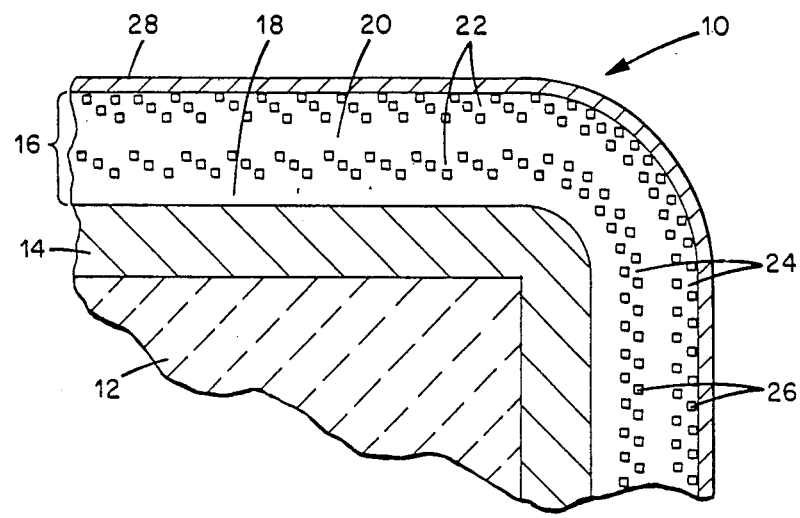
FIGS. 1 and 2 are schematic cross-sectional representations of different embodiments of an article according to the invention.

The article according to the present invention may be prepared by deposition of an adherent two or more phase composite oxide-based coating on a cemented metal carbide substrate, for example, a WC-Co or related material. The deposition of a two or more phase oxidebased composite coating which is adherent to the substrate, wear resistant, high temperature resistant and resistant to chemical attack or breakdown at high temperatures depends on careful control of the process parameters. The outstanding properties of the coating are a result of the second phase of discrete particles of $Al_2O_3$, $ZrO_2$, or $Y_2O_3$, or a combination of these, within an $Al_2O_3$, $ZrO_2$, or $Y_2O_3$ matrix. For example, the preferred coatings include $ZrO_2$ particles and/or $Y_2O_3$ particles within a continuous $Al_2O_3$ matrix, $Y_2O_3$ particles within a continuous $ZrO_2$ matrix, $ZrO_2$ particles within a continuous $Y_2O_3$ matrix, or $Y_2O_3$ stabilized $ZrO_2$ particles, i.e. of an $Y_2O_3$-$ZrO_2$ solid solution, within a continuous $Al_2O_3$ matrix. The particles may be evenly distributed throughout the matrix, or their distribution may be controlled to achieve, for example, a stratified structure of single-phase oxide matrix portions alternating with two or more phase matrix/particle portions, preferably disposed at controlled intervals throughout the matrix. Similarly, the deposition may be controlled to deposit a single-phase continuous portion of controlled depth of the matrix material below the two or more phase portion of the coating.

The preferred process for preparing the articles according to the invention, as described in above-referenced application (No. 071,005,001), involves the use of a mixture of gases including a mixture of metal halides and other reactant gases under carefully controlled conditions to deposit by chemical vapor deposition (CVD) compounds of the metals on a substrate. Alternatively, the article may be produced by an appropriate physical vapor deposition (PVD) techniques.

In the most preferred CVD process, the metal halides are produced by passing halide gas or gases over the metals, for example metal particulates. For example, the metals maybe combined as a mixture of metals, as a metal alloy, or as metal salts. A single halide gas is passed over the combined metals to form a mixture of metal halides. Alternatively, at least the metal forming the matrix is separate, and separate halide gas streams are passed over the metals to form separate metal halides, which are later combined. Carrier gases, for example Ar, may be combined with the halide gases. Preferred halide gases are $Cl_2$ and HCl, forming with the metals described above $AlCl_3$, and/or $ZrCl_4$, and/or $YCl_3$. These are combined with suitable other gases such as $H_2$ and $ClO_2$ or other volatile oxidizing gases, such as $H_2O$.

In order to achieve a first-phase matrix containing discrete particles of a second phase or phases, it is important to control the relative deposition by controlling such parameters as gas flow rates to produce the desired deposition of first and second phase materials.

Further control over the deposition process may be achieved by pulsing the metal halide gas forming the second phase or phases while maintaining continuous flow of the metal halide gas forming the matrix. This pulsing method may also be used to control the distribution of the second phase within the matrix, for example to achieve either an even distribution or a stratified distribution as described above.

Likewise, a single metal halide gas may be allowed to flow, with the other reactant gases, for a period of time sufficient to deposit a continuous single-phase portion of the material comprising the matrix, before the two-phase portion or alternating single-phase/two-phase portion of the coating is deposited.

Some examples of composite coatings according to the invention are: $Al_2O_3$ matrix/$ZrO_2$ particles, $ZrO_2$ matrix/$Y_2O_3$ particles, $Y_2O_3$ matrix/$ZrO_2$ particles, $Al_2O_3$ matrix/$Y_2O_3$ stabilized $ZrO_2$ particles, $Al_2O_3$ matrix/$Y_2O_3$ particles, and $Al_2O_3$ matrix/$ZrO_2$ particles and $Y_2O_3$ particles.

The terms second phase and two-phase as used herein refer to composites comprising a first phase, continuous oxide matrix compound and one or more additional or second phases which may be a single compound or more than one compound, in the form of discrete particles. The particles may be oxides of a single metal or a solid solution of oxides of more than one metal, and the individual particles maybe of the same or different compounds. The particles disclosed herein may be regularly shaped, as spheres, rods, whiskers, etc. or irregularly shaped.

The composite coatings according to the invention are fully dense, adherent, and make it possible to combine the wear-resistant properties of two or more components without the problems associated with differences in expansion coefficients and adhesion presented by layering of continuous coatings of the materials.

Further improvement in the adhesion of the coating to the substrate may be achieved by depositing between the composite coating and the substrate a thin intermediate layer of TiC, TiN, or other carbide, nitride or carbonitride of Ti, Zr, Hf, Va, Nb, Ta, Cr, Mo, W, Si or B. Such deposition may be achieved in known manner as a preliminary part of the same coating process or in a separate, prior coating process. Similarly, for special applications, for example friction, cosmetic, wear or thermal purposes, a thin outer layer such as TiN may be applied in known manner over the composite coating.

Figure 2:
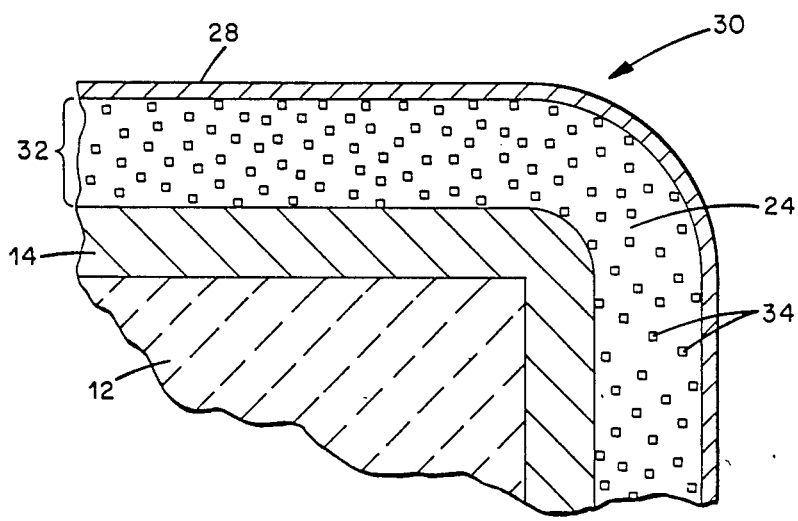

FIGS. 1 and 2, not drawn to scale, schematically illustrate typical coated articles 10 and 30 according to the invention. As shown in FIG. 1, substrate 12 is a shaped cemented WC material, and may be a cutting tool or other article requiring wear resistance under the extreme conditions described above. A thin layer 14 of TiC covers the substrate, at least in the area subjected to wear. Composite layer 16 is deposited over TiC layer 14, and is made up of single-phase matrix portions 18 and 20 of $Al_2O_3$, and two-phase portions 22 of an $Al_2O_3$ matrix 24 and discrete particles 26 of $ZrO_2$. As shown in FIG. 1, there is no separation between the $Al_2O_3$ of matrix 24 of two-phase portions 22 and that of single-phase matrix portions 18 and 20. The $Al_2O_3$ of the composite coating is a single continuous matrix having a second phase of controlled composition and distribution dispersed therein. An outer layer 28 of TiN is deposited over the composite layer, giving article 10 a distinctive identifying color.

FIG. 2 illustrates an alternate embodiment of the article according to the invention. Like features in the two figures are identified by the same reference numerals. In FIG. 2, substrate 12 is overlaid with thin TiC layer 14 in the same manner as shown in FIG. 1. Composite layer 32 is deposited over TiC layer 14, and is made up of $Al_2O_3$ matrix 24 with particles 34 of $Y_2O_3$ stabilized $ZrO_2$ evenly distributed throughout matrix 24. Outer layer 28 of TiN is deposited over the composite layer.

The following Examples are presented to enable those skilled in this art to more clearly understand and practice the present invention. These Examples should not be considered as a limitation upon the scope of the invention, but merely as being illustrative and representative thereof.

EXAMPLES 1-6

After rinsing of all gas lines with their respective gases for 0.5-1 hr, samples of cutting tool inserts of a cemented carbide material, steel cutting grade C-5, were coated with a layer of TiC about 3 microns thick by known techniques in a CVD reactor. An excess of preweighed zirconium metal chips was placed in a separate vessel disposed in the reactor. An excess of aluminum chips was placed in a vessel outside the reactor. The reactor was evacuated to about 10 torr, then heated under low pressure, while being flushed with flowing hydrogen, to increase the outgassing before deposition. Following the deposition procedure, the reactor was cooled, at the deposition pressure and while being flushed with hydrogen, to about 300° C., then under ambient pressure and flowing nitrogen to room temperature.

The deposition reaction conditions for Examples 1-6 are given in Table I, below. For all of these Examples the halide gas was $Cl_2$, the carrier gas for the Al and Zr reactions was Ar, and the other reactant gas was $ClO_2$ with $H_2$ as a carrier. The $Cl_2$ flow rates were adjusted to give the metal chloride flow rates shown in Table I. The deposition pressure for Examples 1-6 was 50 torr; the temperature, 1040° C. For each of these Examples, a period of $Al_2O_3$ deposition (single-phase) ranging from 0.5 to 2.5 hrs was carried out before the two-phase $Al_2O_3/ZrO_2$ deposition was begun. During the single-phase deposition Ar gas was allowed to flow over the Zr, but the $Cl_2$ gas flow was shut off.

TABLE I

| Ex. | Deposition | Flow Rate, ccpm Total/Reactant | $H_2$ vol % | $CO_2$ vol % | $AlCl_3$ vol % | $ZrCl_4$ vol % | Time hrs | $ZrCl_4$ Pulse |
|---|---|---|---|---|---|---|---|---|
| 1 | $Al_2O_3$ | 1420/1020 | 88 | 7 | 2.5 | 0 | 2 | none |
|   | $Al_2O_3/ZrO_2$ |  |  |  | 2.5 | 2.5 | 0.5 | 10 min each 20 mins |
| 2 | $Al_2O_3$ | 1420/1020 | 88 | 7 | 2.5 | 0 | 2 | none |
|   | $Al_2O_3/ZrO_2$ |  |  |  | 2.5 | 1.0 | 1 | 10 min each 20 mins |
| 3 | $Al_2O_3$ | 1420/1020 | 88 | 7 | 2.5 | 0 | 1 | none |
|   | $Al_2O_3/ZrO_2$ |  |  |  | 2.5 | 2.5 | 2.5 | 8 min each |

TABLE I-continued

| Ex. | Deposition | Flow Rate, ccpm Total/Reactant | $H_2$ vol % | $CO_2$ vol % | $AlCl_3$ vol % | $ZrCl_4$ vol % | Time hrs | $ZrCl_4$ Pulse |
|---|---|---|---|---|---|---|---|---|
| 4 | $Al_2O_3$ | 1420/1020 | 88 | 7 | 2.5 | 0 | 1 | 22 mins none |
|  | $Al_2O_3/ZrO_2$ |  |  |  | 2.5 | 2.5 | 2.5 | 8 min each 22 mins |
| 5 | $Al_2O_3$ | 1420/1020 | 88 | 7 | 2.5 | 0 | 1 | none |
|  | $Al_2O_3/ZrO_2$ |  |  |  | 2.5 | 2.5 | 2.5 | 8 min each 22 mins |
| 6 | $Al_2O_3$ | 1420/1020 | 88 | 7 | 2.5 | 0 | 1 | none |
|  | $Al_2O_3/ZrO_2$ |  |  |  | 2.5 | 2.5 | 2.5 | 8 min each 22 mins |

The results of Examples 1–6 are shown in Table II. The thickness of the coatings was measured by the abrasive ball method (Calotest). The chemical composition of the coating was determined by X-ray diffraction analysis. The coating was deposited on the TiC underlayer as a stratified composite of alternating alumina and alumina/zirconia portions over a single-phase alumina portion, similar to that illustrated in FIG. 1, but without the TiN layer over the oxide coating. The oxide coating and the TiC underlayer show satisfactory thickness and good adherence.

TABLE II

| Example | Oxides thickness, microns | X-Ray Diffraction |
|---|---|---|
| 1 | — | $\alpha - Al_2O_3 + ZrO_2$ |
| 2 | 1.8 | $\alpha - Al_2O_3 + ZrO_2$ |
| 3 | 5 | $\alpha - Al_2O_3 + ZrO_2$ |
| 4 | 0.5–2 | $\alpha - Al_2O_3 + ZrO_2$ |
| 5 | 0.7–1.5 | $\alpha - Al_2O_3 + ZrO_2$ |
| 6 | 1.5 | $\alpha - Al_2O_3 + ZrO_2$ |

Machining tests were performed on the tool inserts samples of Example 6 (A) and, for comparison, on a ceramic based insert (B), and on two different commercial grades of TiC based insert coated with $Al_2O_3$ (C and D).

Figure 3:
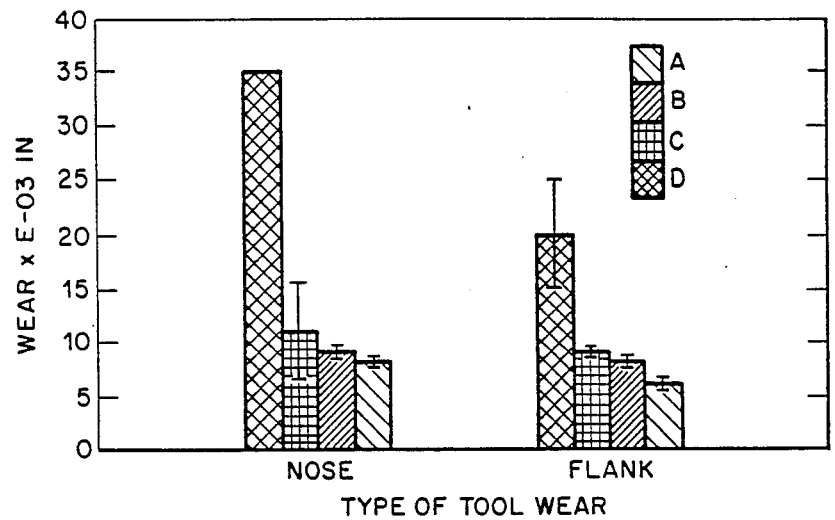
FIG. 3 is a bar graph of comparative machining results.

Inserts A, B, C and D were tested by turning a 4340 steel workpiece under dry conditions at 700 sfm, 0.01 ipr, 0.5 in DOC. For each insert, 28 cu. in. of metal were removed in 6.7 min cutting time. The results are illustrated in FIG. 3, showing the average nose and flank wear for each type of insert. The inserts coated by the method according to the invention compared favorably with the materials in current commercial use.

EXAMPLES 7–8

The process of Examples 1–6 was repeated for Examples 7 and 8, to coat the same type of TiC coated cemented carbide cutting tool inserts, except that both $AlCl_3$ and $ZrCl_4$ were flowing during the entire deposition period. The deposition pressure and temperature were 50 torr and 1040° C. respectively. The remaining reaction conditions are given in Table III below. The resulting composite coatings were similar to that illustrated in FIG. 2, except that no TiN layer was deposited over the oxide coating. The coating was a continuous $ZrO_2$ matrix with $Al_2O_3$ particles distributed therein. No single phase portion was deposited below the two phase portion of the oxide layer.

TABLE III

| Ex. | Flow Rate ccpm Total/Reactant | $H_2$ | $CO_2$ | $AlCl_2$ | $ZrCl_4$ | Time hrs. |
|---|---|---|---|---|---|---|
| 7 | 1420/1020 | 65.7 | 29.3 | 2.5 | 2.5 | 2.8 |

TABLE III-continued

| Ex. | Flow Rate ccpm Total/Reactant | $H_2$ | $CO_2$ | $AlCl_2$ | $ZrCl_4$ | Time hrs. |
|---|---|---|---|---|---|---|
| 8 | 1100/800 | 88 | 7 | 2.5 | 2.5 | 3 |

While there has been shown and described what are at present considered the preferred embodiments of the invention, it will be obvious to those skilled in the art that various changes and modifications can be made therein without departing from the scope of the invention as defined in the appended claims.

We claim:

1. A wear resistant article comprising:
   a cemented carbide substrate body; and
   a fully dense, adherent, wear resistant, composite ceramic coating having at least two phases on the substrate comprising:
      a continuous oxide layer about 0.1–20 microns thick of a material selected from the group consisting of the oxides of aluminum, zirconium, and yttrium; and
      at least one discontinuous additional phase dispersed as discrete particles within the oxide layer, of at least one material selected from the group consisting of oxides of aluminum, zirconium, and yttrium, the at least one material being different from that of the oxide layer.

2. An article according to claim 1 further comprising, between the substrate body and the composite ceramic layer, at least one intermediate layer about 0.5–10 microns thick of one or more materials selected from the group consisting of carbides, nitrides, and carbonitrides of Ti, Zr, Hf, Va, Nb, Ta, Cr, Mo, W, Si, and B.

3. An article according to claim 1 wherein the continuous oxide layer is $ZrO_2$ and the additional phase is $Y_2O_3$.

4. An article according to claim 1 wherein the continuous oxide layer is $Y_2O_3$ and the additional phase is $ZrO_2$.

5. An article according to claim 1 wherein the continuous oxide layer is $Al_2O_3$ and the additional phase is $Y_2O_3$ stabilized $ZrO_2$.

6. An article according to claim 1 wherein the continuous oxide layer is $Al_2O_3$ and the additional phases are $Y_2O_3$ particles and $ZrO_2$ particles.

7. An article according to claim 1 wherein the additional phase is substantially evenly dispersed within the continuous oxide layer.

8. An article according to claim 7 wherein the continuous oxide layer is $Al_2O_3$ and the additional phase is $ZrO_2$.

9. An article according to claim 8 further comprising, between the substrate body and the composite ceramic layer, an intermediate layer of TiC or TiN about 2.5 microns thick.

10. An article according to claim 8 wherein the $ZrO_2$ particles comprise less than 5 volume % of the composite ceramic layer.

11. An article according to claim 1 wherein the composite ceramic layer is a stratified layer in which portions having at least two phases alternate with single phase continuous oxide portions.

12. An article according to claim 11 wherein the substrate body is a WC-Co composite, the continuous oxide layer is $Al_2O_3$ and the additional phase is $ZrO_2$ particles dispersed within the $Al_2O_3$ to form two-phase $Al_2O_3/ZrO_2$ portions alternating with single-phase continuous $Al_2O_3$ portions, and further comprising, between the substrate body and the composite ceramic layer, an intermediate layer of TiC about 2–5 microns thick.

13. An article according to claim 12 wherein the $ZrO_2$ particles comprise less than 5 volume % of the composite ceramic layer.

* * * * *

UNITED STATES PATENT AND TRADEMARK OFFICE
CERTIFICATE OF CORRECTION

PATENT NO. : 4,701,384
DATED : October 20, 1987
INVENTOR(S) : Sarin et al.

It is certified that error appears in the above—identified patent and that said Letters Patent is hereby corrected as shown below:

Column 1, line 7, "(D-071,005,001) should be --07/005,001--.

Column 2, line 42, "(No. 071,005,001)" should be --07/005,001--; and line 64, "$ClO_2$" should be --$CO_2$--.

Column 4, line 48, "$ClO_2$" should be --$CO_2$--.

Signed and Sealed this

First Day of March, 1988

Attest:

DONALD J. QUIGG

Attesting Officer

Commissioner of Patents and Trademarks